United States Patent
Thiery

(10) Patent No.: US 7,015,681 B2
(45) Date of Patent: Mar. 21, 2006

(54) POWER SWITCHING CIRCUIT WITH CURRENT SHARING CAPABILITY

(75) Inventor: Vincent Thiery, La Roque d'Antheron (FR)

(73) Assignee: International Rectifier Corporation, El Segundo, CA (US)

( * ) Notice: Subject to any disclaimer, the term of this patent is extended or adjusted under 35 U.S.C. 154(b) by 40 days.

(21) Appl. No.: 10/888,689

(22) Filed: Jul. 8, 2004

(65) Prior Publication Data

US 2006/0006853 A1    Jan. 12, 2006

(51) Int. Cl.
    *G05F 1/569* (2006.01)
(52) U.S. Cl. .................... 323/276; 323/277; 363/50
(58) Field of Classification Search .............. 323/274, 323/275, 276, 277, 278, 279, 314; 361/91.7; 363/50, 56.03, 56.12

See application file for complete search history.

(56) References Cited

U.S. PATENT DOCUMENTS

| | | | | |
|---|---|---|---|---|
| 5,428,523 A | * | 6/1995 | McDonnal | 363/71 |
| 5,530,340 A | * | 6/1996 | Hayakawa et al. | 323/314 |
| 6,879,501 B1 | * | 4/2005 | Mori | 363/56.03 |

* cited by examiner

*Primary Examiner*—Jessica Han
(74) *Attorney, Agent, or Firm*—Ostrolenk, Faber, Gerb & Soffen, LLP

(57) ABSTRACT

A power switching circuit comprising a first power switching device the first power switching device having a control electrode and two main current carrying electrodes, a sense circuit for providing a signal proportional to the current through the first power switching device and an active clamp circuit connected to said control electrode of said first power switching device, wherein said active clamp circuit provides a variable clamp voltage between one of the main electrodes of the first power switching device and the control electrode when the current in the first power switching device exceeds a threshold level the variable clamp voltage being related to current through the first power switching device.

9 Claims, 2 Drawing Sheets

US 7,015,681 B2

POWER SWITCHING CIRCUIT WITH CURRENT SHARING CAPABILITY

FIELD OF THE INVENTION

The present invention relates to a power switching circuit including an active clamp circuit which varies the clamp voltage thus allowing parallel connected power switching devices to share current provided to a load.

BACKGROUND OF THE INVENTION

FIG. 1 shows a typical prior art circuit in which two power MOSFETS 1 and 2 are connected in parallel to control a load 3, which may comprise a motor.

Each MOSFET 1 and 2 has an active clamp circuit comprising a zener diode and a diode, 5, 5' and 6, 6', respectively, connected between the gate and the common drain electrodes. The active clamp circuit serves to clamp the drain voltage at a specified level to prevent avalanche of the MOSFET.

In circuits of this type, a problem is encountered in that due to small variations in the voltage at which the clamp circuits operate, one of the parallel power MOSFET devices will essentially pass all of the current, or most of the current. With reference to FIG. 2, the clamp circuit for the device 1 and the clamp circuit for the device 2 have slightly different clamp voltages. The clamp voltage is typically determined by the zener diode 5, 6. The zener diode 5,6, will avalanche when the voltage across the zener diode exceeds the zener voltage, clamping the drain voltage. However, due to small variations, the clamp voltages of he two parallel devices may be somewhat different. As shown in FIG. 2, the graph of current versus voltage is very steep as the clamp clamps at the specified voltage and essentially maintains that clamp voltage. Accordingly, for the example shown in FIG. 2, the device 1 will pass most of the current because the clamp 6 for the device 2 does not activate, i.e., the zener diode 6 fails to avalanche because the drain voltage is clamped by the clamp circuit for the switch 1. As a result, substantially all of the current is passed by the device 1 and not the device 2 causing much more heating of the device 1. Thus, the parallel arrangement of the devices 1 and 2 fails to accomplish the goal of sharing current between the two parallel connected devices.

SUMMARY OF THE INVENTION

It is an object of the present invention to provide a power switching circuit having a current sharing capability such that multiple power switching circuits according to the invention may be connected in parallel whereby the power switches connected in parallel can share in carrying the current provided to the load.

According to the present invention, an active clamp circuit is provided wherein the voltage across the clamp circuit varies as a function of current. In this way, once the voltage across the active clamp circuit of a first power switching device has increased to the level of the clamp circuit of a parallel connected second power switching device, the second power switching device will participate in current sharing.

The above and other objects of the present invention are achieved by a power switching circuit comprising a first power switching device, the first power switching device having a control electrode and two main current carrying electrodes, a sense circuit for providing a voltage proportional to the current through the first power switching device, an active clamp circuit connected to said control electrode of said first power switching device, wherein said active clamp circuit provides a variable clamp voltage between one of the main electrodes of the first power switching device and the control electrode when the current in the first power switching device exceeds a threshold level, the variable clamp voltage being related to current through the first power switching device.

The above and other objects are also achieved by a method for balancing the currents drawn by two parallel connected power switching devices providing current to a load, the method comprising, sensing a current through each of the power switching devices, and activating an active clamp coupled to each of the switching devices, each active clamp having a threshold voltage at which clamping begins and providing a variable clamp voltage once activated proportional to current through the respective active clamp so that, should the respective active clamps have different threshold voltages, each of the two parallel connected power switching devices will share current to the load once the respective active clamps begin passing current.

The invention is also applicable to power switching devices other than MOSFETs, e.g., IGBTs.

Other features and advantages of the present invention will become apparent from the following description of the invention which refers to the accompanying drawings.

BRIEF DESCRIPTION OF THE DRAWING(S)

DETAILED DESCRIPTION OF THE INVENTION

Figure 3:
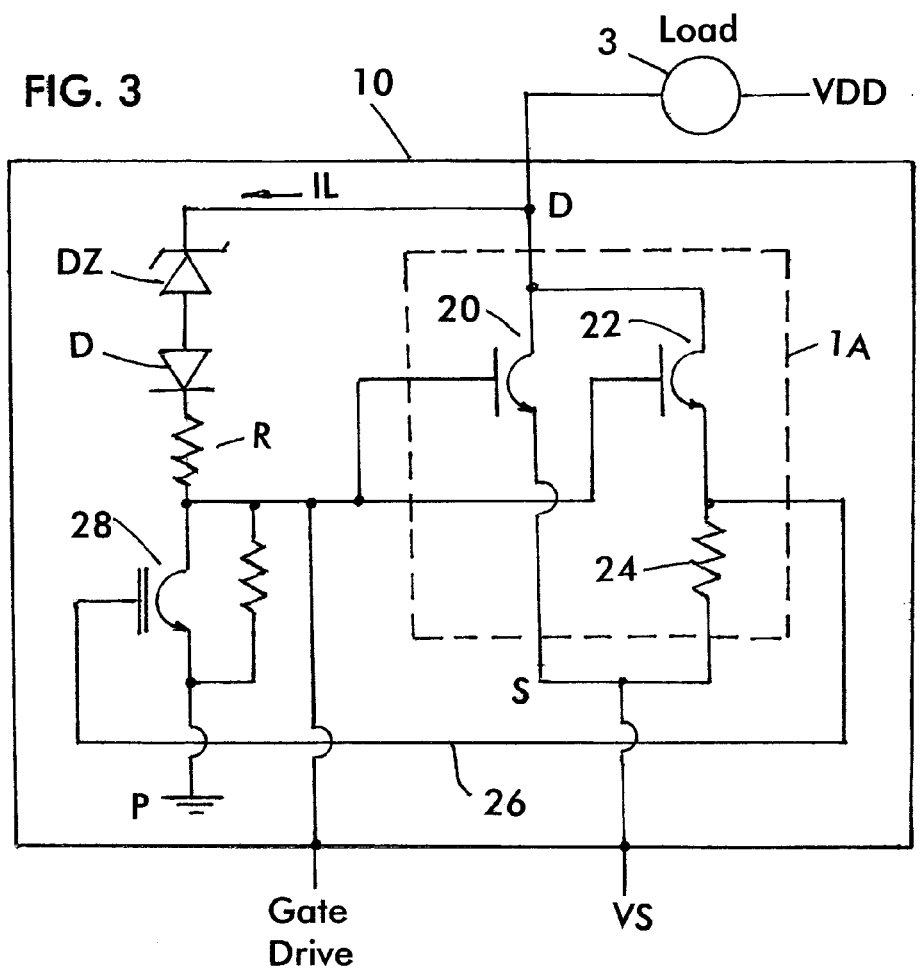
FIG. 3 shows a power switching circuit according to the present invention having an active clamp providing a varying clamp voltage thus allowing the power switching circuit to share current with other power switching circuits of the same type connected in parallel.

Referring to FIG. 3, a power switching circuit including an active clamp having a variable clamp voltage is shown. The power switch is illustratively a MOSFET although it could be an IGBT. The circuit allows the power MOSFET, when connect in parallel with like circuits including power MOSFETs, to share current provided to the load.

With reference to FIG. 3, a power MOSFET 1A is shown. The power MOSFET includes a number of cells 20 which provide the main current carrying capability. A sense cell 22 is provided coupled in series with a resistance 24 to provide a current sense feedback on line 26. The cells 20 and 22 are connected in parallel as shown. Line 26 is connected to the gate of a further MOSFET 28. MOSFET 28 is coupled in series with a zener diode DZ and a resistor R and optionally a diode D between the drain of the power MOSFET 1A and a potential P.

In operation, when the gate drive is provided to power MOSFET 1A, cells 20 and 22 turn on providing power to the load 3 of course, the load can be connected instead between source and ground. The current sense 22 provides current through resistor 24 which provides a feedback voltage of line 26 to FET 28. Once its threshold is reached, FET 28 turns on, thus clamping the voltage between the drain and gate of MOSFET 1A when the zener diode DZ avalanches. Because resistor R is in series with the zener diode, the voltage between the drain and the gate of power switch 1A can vary with current, as shown by line 1A of FIG. 5. As the current increases, the voltage across power MOSFET 1A will increase.

Figure 1:
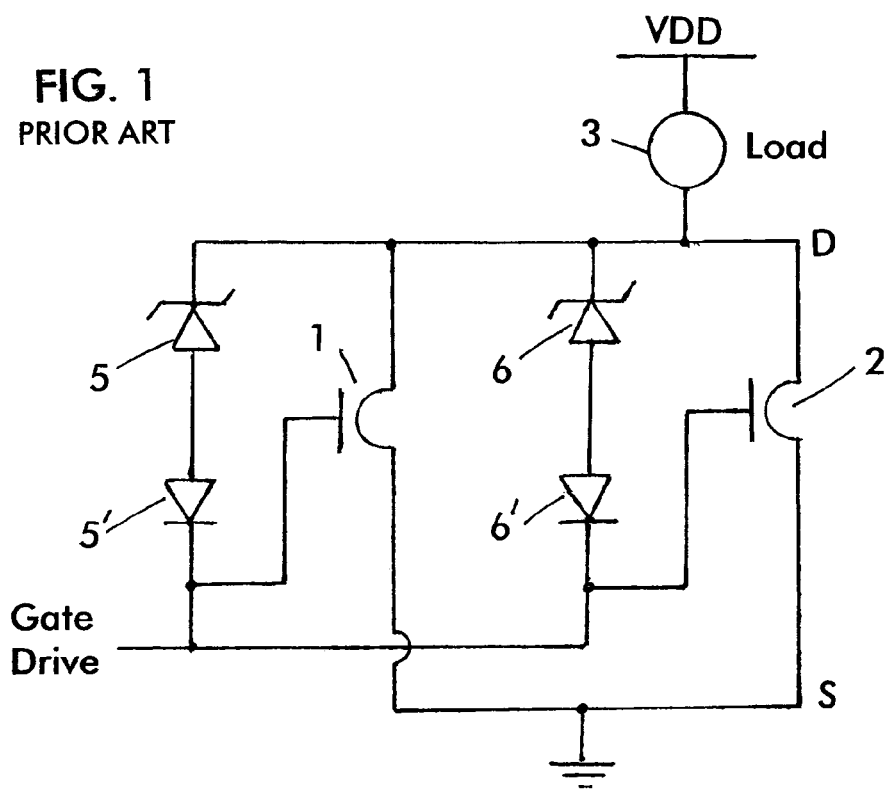
FIG. 1 shows a prior art circuit employing two parallel MOSFETs driving a load.
Figure 2:
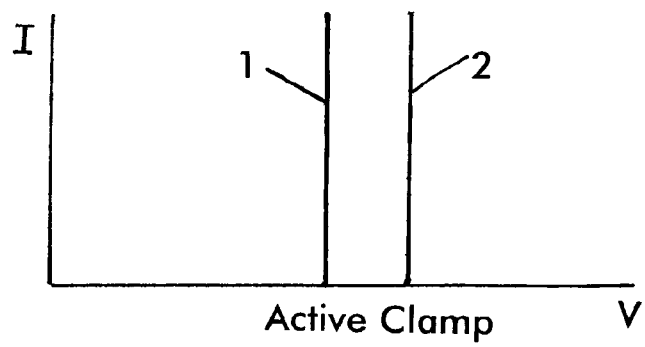
FIG. 2 shows an illustrative graph providing an example of operation of the clamp circuits of the circuit of FIG. 1.
Figure 5:
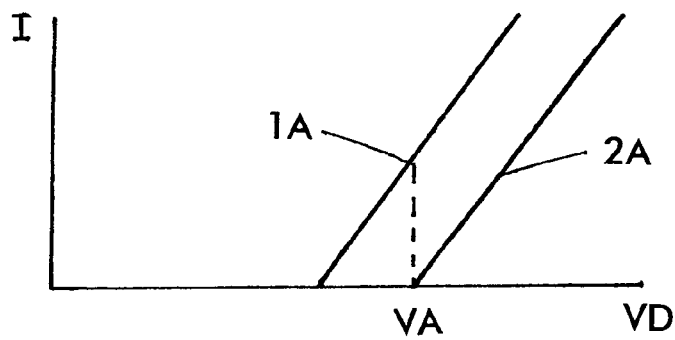
FIG. 5 shows the operation of the active clamps of the circuits of FIGS. 3 and 4.
Figure 4:
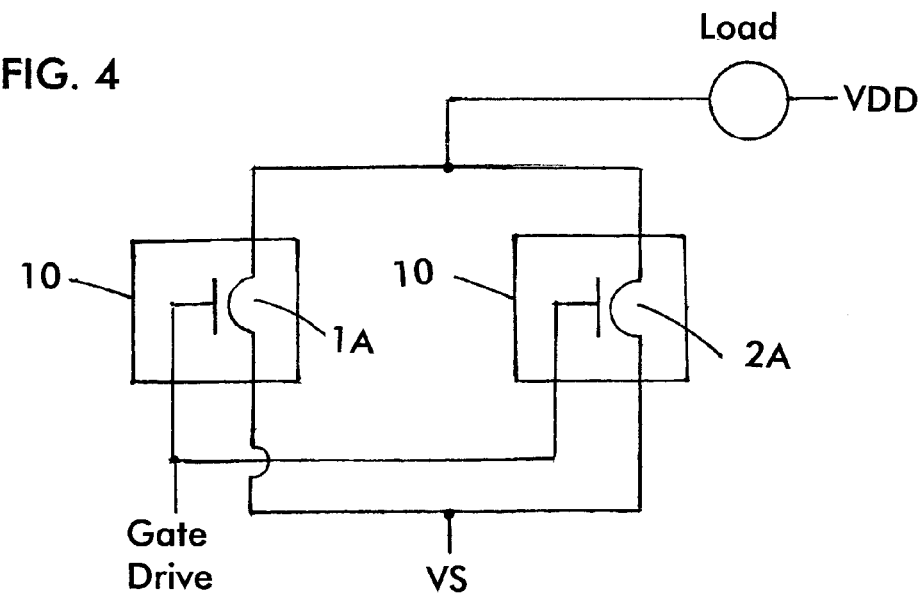
FIG. 4 shows two of the circuits of FIG. 3 connected in parallel driving a load.

This is beneficial because if two of the circuits 10 of FIG. 3 are placed in parallel as shown in FIG. 4 (clamp circuit are not shown in FIG. 4), and if, as is usually the case, the active clamp of the MOSFET 1A has a slightly different cut in voltage as shown in FIG. 5, than the active clamp of the switch 2A (in the example of FIG. 5, the switch 1A has a lower clamp voltage), then, when the voltage VA is reached, the active clamp of the switch 2A will activate, thereby allowing the second device 2A to share in providing current to the load 3. Accordingly, the first device 1A will pass most of the current until the clamp voltage of the first device reaches the clamp voltage of the second device 2A. The clamp voltage is VZ+R×IL where IL is the current through the zener diode DZ. When the clamp voltage of the first device=V clamp of the second device, the second device 2A will thus share in providing current to the load. This allows more balanced load current distribution between the parallel devices.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power switching circuit comprising:
   a first power switching device, the first power switching device having a control electrode and two main current carrying electrodes;
   a sense circuit for providing a signal proportional to the current through the first power switching device; and
   an active clamp circuit connected to said control electrode of said first power switching device, wherein said active clamp circuit provides a variable clamp voltage between one of the main electrodes of the first power switching device and the control electrode when the current in the first power switching device exceeds a threshold level, the variable clamp voltage being related to current through the first power switching device.

2. The power switching circuit of claim 1, wherein said first power switching device comprises a MOSFET or IGBT.

3. The power switching circuit of claim 1, wherein said sense circuit comprises a current detection element connected to said active clamp circuit and to said first power switching device.

4. The power switching circuit of claim 3, wherein said current detection element comprises a current sense cell of said first power switching device.

5. The power switching circuit of claim 4, further comprising a resistor in series with said current sense cell.

6. The power switching circuit of claim 3, wherein said active clamp circuit includes a switching device having a control electrode, said control electrode being electrically connected to said current detection element, whereby current exceeding said threshold level generates a voltage at said control electrode of said switching device of said active clamp circuit to turn on said switching device of said active clamp circuit, said active clamp circuit further comprising a voltage clamp circuit connected in parallel with said control electrode of said first power switching device and the one of the main electrodes of said first power switching device, wherein turning on said switching device of said active clamp circuit causes said voltage clamp circuit to be activated thereby generating the variable clamp voltage between the one of the main electrodes of the first power switching device and the control electrode of the first power switching device.

7. The power switching circuit of claim 6, wherein said voltage clamp circuit includes a resistor and a zener diode in series with each other, and wherein said resistor is connected in series with a main electrode of said switching device of said active clamp circuit, and said control electrode of said first power switching device is connected between said resistor and said main electrode of said switching device of said active clamp circuit.

8. The power switching circuit of claim 1, wherein the power switching circuit comprises a first power switching circuit, further comprising a second power switching circuit connected in parallel with said first power switching circuit, thereby enabling the first power switching circuit and second power switching circuit to share in providing current to a load, whereby each power switching circuit begins to share current to the load when its respective active clamp circuit begins to pass current therethrough.

9. A method for balancing the currents drawn by two parallel connected power switching devices providing current to a load, the method comprising:
   sensing a current through each of the power switching devices; and
   activating an active clamp coupled to each of the switching devices, each active clamp having a threshold voltage at which clamping begins and providing a variable clamp voltage once activated proportional to current through the respective active clamp so that, should the respective active clamps have different threshold voltages, each of the two parallel connected power switching devices will share current to the load once the respective active clamps begin passing current.

* * * * *